Dec. 10, 1968   J. A. ALTAMURA   3,414,962

ELECTRODE ASSEMBLY JIG AND METHOD THEREOF

Filed July 25, 1966   3 Sheets-Sheet 1

INVENTOR.
Joseph A. Altamura
BY Ernst G. Almy
Agent

Dec. 10, 1968   J. A. ALTAMURA   3,414,962
ELECTRODE ASSEMBLY JIG AND METHOD THEREOF
Filed July 25, 1966   3 Sheets-Sheet 2

INVENTOR.
Joseph A. Altamura

United States Patent Office 3,414,962
Patented Dec. 10, 1968

3,414,962
ELECTRODE ASSEMBLY JIG AND METHOD
THEREOF
Joseph A. Altamura, Levittown, Pa., assignor to Atlas Chemical Industries, Inc., Wilmington, Del., a corporation of Delaware
Filed July 25, 1966, Ser. No. 567,746
8 Claims. (Cl. 29—428)

This invention relates to a method and apparatus for inserting pins into apertured work pieces and more particularly for inserting electrodes into apertured headers.

Various electrical devices such as vacuum tubes have as a component thereof what are known as headers which are equipped with at least one metal electrode or pin. Such a header may be comprised of a metal disc provided with one or more holes therein to accommodate the desired number of electrodes. Generally, the electrodes are welded in metal header discs by means of glass seals. This is accomplished by placing an apertured glass bead in each of said holes in the metal headers. Then, the electrodes are inserted into the apertured glass beads. Thereafter, the headers with the electrodes in place are passed through a furnace in order to bring about a seal between the glass beads and headers and the electrodes and glass beads to form individual fused units.

The present method and apparatus are of particular value in assembling relay headers. Prior to the present invention it was a tedious and time consuming task to assemble such headers by placing each pin or electrode in a header on a one-at-a-time basis by hand with the use of tweezers. In the course of the present description, language relating to placing pins or electrodes in headers also includes, for the purpose of simplicity, the placing of the pins in apertured glass beads previously placed in apertured headers or work pieces.

In accordance with the present invention an assembly means or jig is provided for inserting metal pins into apertured work pieces comprising a base means adapted to support a plurality of apertured work pieces and a guiding means adapted to be positioned adjacent to said work pieces and base means to form a sandwiched structure. The said guiding means is provided with a plurality of holes each having a wide portion and a narrow portion. The said wide portions have a substantially flat-shaped bottom and a diameter equal to at least the diameter of three pins to be inserted and greater than one-half the length of one such pin and narrow enough so that pins standing therein will be in a substantially vertical position. The narrow portions of said holes are adapted to receive one pin and be positioned contiguous to and in alignment with the apertures in said work pieces. The holes in the guiding means may be described generally as being counterbored holes wherein the bottoms of the counterbored portions of said holes are substantially flat-shaped so as to prevent jamming or clogging of pins to be inserted in the narrow portions of said holes such as would occur if the holes in the guiding means were funnel shaped. The present jig can be held in assembled position by any suitable retaining means. For example, a plurality of pins may be inserted through the present sandwiched structure or one or more suitable clamps may be used to hold the said base means, work pieces and guiding means in the desired relationship. A vibrating means is provided for vibrating the said sandwiched base means, work pieces and guiding means.

In the process of loading pins in work pieces according to the present invention, the apertured work pieces are first placed on the base means. Then, a guiding means, provided with a plurality of holes each having a wide portion and a narrow portion wherein the wide portions of said holes have a substantially flat-shaped bottom and the narrow portions of said holes are adapted to receive one pin, is positioned on top said headers and base means to form a sandwiched unit so that the narrow portions of said holes are contiguous to and in alignment with the apertures in said work pieces. The wide portions of said holes preferably have a diameter equal to at least the diameter of three pins to be inserted and greater than one-half the length of one such pin. The said wide portions should also be sufficiently narrow so that pins standing therein will be in a substantially vertical position. The narrow portions of said holes have a diameter approximately equal to the diameter of the apertures in said work pieces. Then, an excess of pins are sprinkled on top of said guiding means. The vibrator is then turned on whereby the vibration causes the said pins to fall into the counterbored holes and into the apertures in said work pieces. Then, the sandwiched unit is tilted to remove the excess pins. Thereafter, the guiding means is removed from the base means containing the apertured work pieces with the pins in place.

The vibrating means as used in the present invention can be any suitable commercially available vibrator such as a Syntron single action vibrator. Such a vibrating means preferably has a flat surface top portion on which can be placed the assembly jig of the present invention. However, the vibrating means can be attached to the assembly jig of the present invention by some other suitable means, for example, a rod or other extension means.

The assembly jig of the present invention is comprised of a base means adapted to support a plurality of work pieces and a guiding means. The base means in a preferred embodiment is comprised of a bottom plate and a template plate suitable to be mounted thereon and to hold apertured work pieces in a desired configuration on said bottom plate. The bottom plate and template may be suitably dimensioned to accommodate any desired number of work pieces.

The guiding means may be comprised of a plurality of apertured plates sandwiched together so as to form holes each having a wide portion and a narrow portion wherein the wide portions of said holes have a substantially flat-shaped bottom. In a preferred embodiment the guiding means is comprised of a middle plate and top plate. The middle plate has about the same outside dimensions as the bottom and template on which it is to be placed and contains a multiplicity of apertures equal in number to the apertures in the headers to be equipped with pins or electrodes. The holes or apertures in the middle plate are of a diameter equal to the apertures in the work pieces. However, the top portion of the holes in the middle plate may be suitably countersunk. The thickness of the middle plate may vary widely; however, generally, most suitable middle plates have a thickness between about ¼″ and ¾″.

The top plate has about the same outside dimensions as the middle plate on which it is to be mounted and contains a multiplicity of apertures equal in number to the apertures in the work pieces to be equipped with pins and the apertures in the middle plate. The apertures in the top plate are comprised of holes each having a wide portion and a narrow portion wherein the wide portions of said holes have a substantially flat-shaped bottom. When sandwiched on top of said middle plate the narrow portions of the apertures in said top plate, which are equal in diameter to the apertures in the middle plate, are contiguous to and in alignment with the holes in said middle plate.

In practice a shield is generally positioned around the perimeter of the guiding means in order to prevent excess or electrodes not yet in position from vibrating off the top surface of the guiding means.

The present invention may be more clearly understood by reference to the accompanying drawing which serves to illustrate a preferred embodiment of the present invention and where like parts are identified by similar reference numbers throughout the several views.

Figure 1:
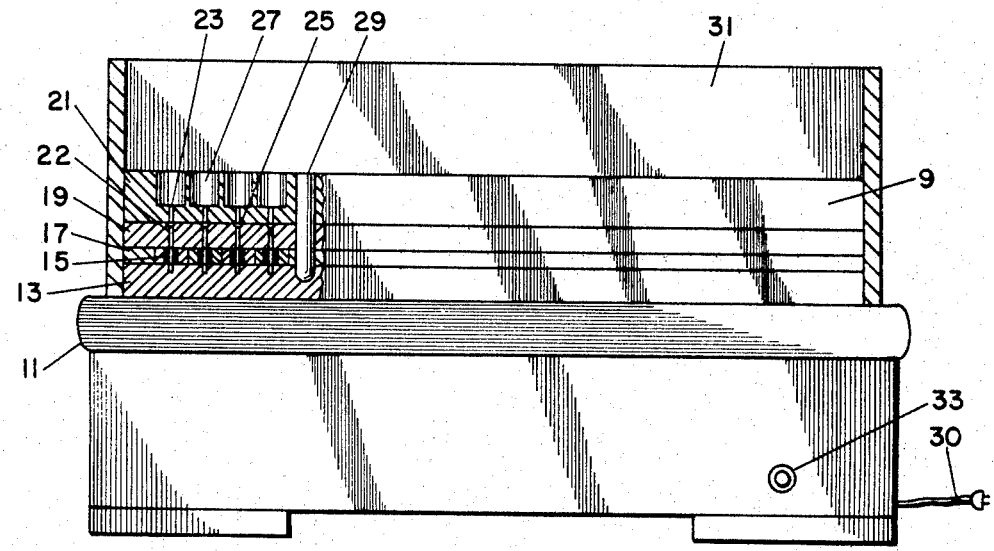
FIGURE 1 shows a partial sectional view of an assembly jig of the present invention.
Figure 2:
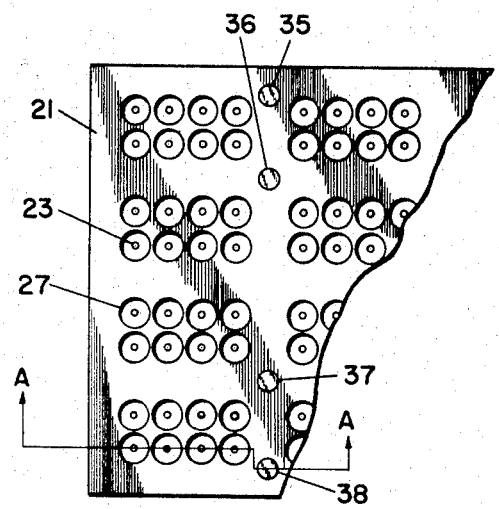
FIGURE 2 is a fragmentary top plan of a top plate of the present invention.
Figure 3:
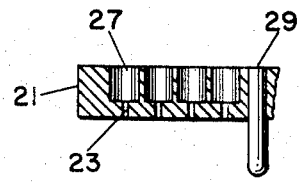
FIGURE 3 is a section of the top plate of FIGURE 2 taken along the line A—A.

The assembly jig 9 shown in FIGURE 1 is comprised of bottom plate 13 which is dimensioned 6⅝ x 4½ x ¼ inches and is positioned on top of vibrating means 11. The bottom plate 13 is made of a heat resistant material such as carbon or Inconel. Positioned immediately on top of bottom plate 13 is template plate 17 containing apertured relay headers 15. The outside dimensions of template 17 is about the same as bottom plate 13; however, template 17 has a thickness of about ⅛". Template plate 17 is made of metal such as steel, aluminum or rigid plastic. Sandwiched on top of headers 15 and template 17 is positioned middle plate 19 containing holes 22 having the upper ends countersunk as shown at point 25 in FIGURES 1, 4 and 5. Middle plate 19 is dimensioned 6⅝ x 4½ x ⅜ inches. Positioned on top of middle plate 19 is top plate 21 containing counterbored apertures having a narrow portion 23 and a wide portion 27 as shown in FIGURES 1, 2 and 3. Top plate 19 has outside dimensions equal to the middle plate 19, template 17, and bottom plate 13 but has a thickness of about ½ inch. The assembly comprising bottom plate 13, template 17 and headers 15, middle plate 19 and top plate 21 are held in a sandwich relationship by means of a plurality of spaced pins such as illustrated by pin 29 in FIGURE 1. The entire assembly jig 9 is enclosed on four sides by a shield 31 which extends about 1½ inches above the surface of the top plate. Shield 31 acts to prevent the excess electrodes which are poured on top of top plate 21 during the assembly process from falling off assembly jig 9 during the vibration of jig 9 by vibrator 11. The middle plate 19, top plate 21 and shield 31 comprising the guiding means can be made of any suitable rigid plastic material or metal such as steel or aluminum. Vibrator 11 is connected to an appropriate power source by means of wire 30 and can be turned on and off by means of electrical switch 33. A fragmentary portion of top plate 21 is shown in FIGURES 2 and 3 containing counterbored holes 27 having narrow portion 23. Holes 35, 36, 37 and 38 in top plate 21 are provided for accommodating pins such as pin 29 as shown in FIGURES 1, 2 and 3. Aligning holes such as 39, 41, 43 and 45 in middle plate 19 and holes 46, 47, 48 and 50 in template 17 are similarly provided to accommodate pins such as 29 to hold assembly 9 in a sandwiched arrangement.

Figure 4:
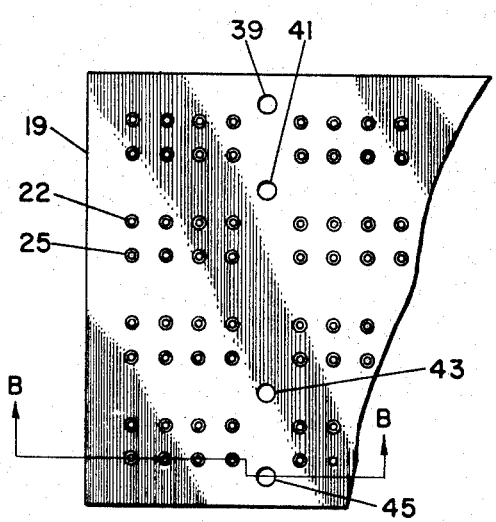
FIGURE 4 is a fragmentary top plan view of a middle plate of the present invention.
Figure 5:
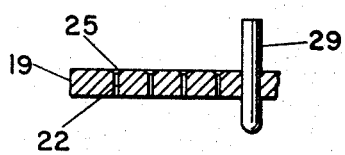
FIGURE 5 is a section of the middle plate of FIGURE 4 taken along the line B—B.

A fragmentary section of middle plate 19 is shown in FIGURE 4. Holes 22 having a countersunk portion 25 as shown in FIGURE 5 are spaced as shown in FIGURE 4.

Figure 6:
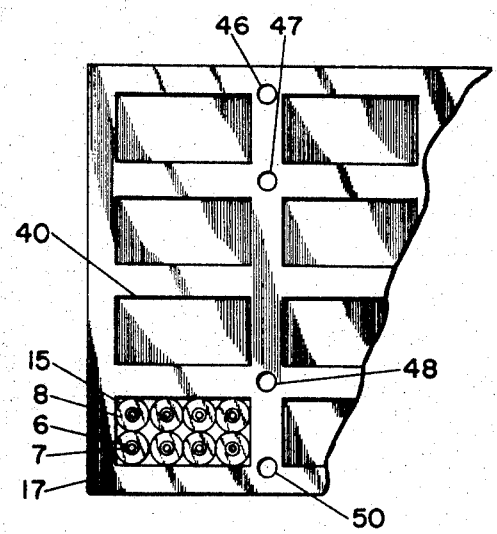
FIGURE 6 is a fragmentary top plan view of a template plate of the present invention.

FIGURE 6 illustrates a template 17 which holds headers 15 in the desired configuration on bottom plate 13 as shown in FIGURE 1. For illustration purposes headers 15 are only shown in one section of template 17. Template 17 is provided with a variable number of slots designated as 40, each of which is adapted to hold apertured headers designated as 15. The holes 23 in top plate 21 and 22 in middle plate 19 when sandwiched on top of template 19 and base plate 13 are contiguous to and in alignment with the apertures 7 of glass beads 6 which are positioned in headers 15 held by template 19 and shown in FIGURES 1 and 6.

Figure 7:
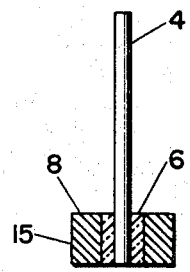
FIGURE 7 is a sectional view of a product of the present apparatus and method thereof.

In the process of using the present assembly apparatus the jig is assembled as shown in FIGURE 1. Then, an excess of electrodes or pins to be introduced into the apertured headers is poured over the top plate 21. The vibrator switch 33 is turned on. As a result of the vibration of vibrator 11 the entire jig 9 is vibrated whereby one pin is caused to fall into each of the apertures of the headers arranged in template 17 in the sandwiched assembly 9. Thereafter, shield 31 is removed and the sandwiched jig 9 is tilted to remove the excess electrodes from the top plate 21. Then, top plate 21, middle plate 19 and template plate 17 are removed from the assembly. Subsequently, the bottom plate 13 supporting the relay headers 15 is placed in an oven at a proper temperature to bring about a seal between glass bead 6 and metal disc 8 of header 15 and glass bead 6 and electrode 4 to form one fused unit as shown in FIGURE 7.

What is claimed is:
1. An assembly means for inserting metal pins into apertured work pieces comprising a base means adapted to support a plurality of apertured work pieces, a guiding means adapted to be positioned adjacent to said work pieces and base means to form a sandwiched structure, provided with a plurality of holes each having a wide portion and a narrow portion wherein the wide portions of said holes have a substantially flat-shaped bottom and the narrow portions of said holes are adapted to receive one pin and be positioned contiguous to and in alignment with the apertures in said work pieces and, a vibrating means for vibrating said sandwiched structure.

2. The assembly of claim 1 wherein the base means is comprised of a bottom plate and a template plate for holding the work pieces in a desired configuration on said bottom plate.

3. The assembly of claim 1 wherein a shield is positioned around the perimeter of the guiding means.

4. The assembly of claim 1 wherein the wide portions of said holes have a diameter equal to at least the diameter of three pins to be inserted and greater than one-half the length of one such pin and narrow enough so that pins standing therein will be in a substantially vertical position.

5. The assembly of claim 1 wherein the guiding means is comprised of a plurality of apertured plates sandwiched together so as to form holes each having a wide portion and a narrow portion wherein the wide portions of said holes have a substantially flat-shaped bottom and the narrow portions thereof are adapted to receive one pin and be positioned contiguous to and in alignment with the apertures in said work pieces.

6. The assembly of claim 5 wherein the wide portions of said holes have a diameter equal to at least the diameter of three pins to be inserted and greater than one-half the length of one such pin and narrow enough so that pins standing therein will be in a substantially vertical position.

7. The process of loading pins in a plurality of apertured headers comprising placing the headers on a base means, attaching a guiding means, provided with a plurality of holes each having a wide portion and a narrow portion wherein the wide portion of said holes have a substantially flat-shaped bottom and the narrow portions of said holes are adapted to receive one pin, on top of said headers and base means to form a sandwiched unit so that the narrow portions of said holes are contiguous to and in alignment with the apertures in said work pieces, sprinkling an excess of pins on said guiding means, vibrating said sandwiched unit so that one pin falls into each of the apertures in said headers.

8. The process of claim 7 wherein the wide portions of said holes have a diameter equal to at least the diameter of three pins to be inserted and greater than one-half the length of one such pin and narrow enough so that pins standing therein will be in a substantially vertical position.

References Cited
UNITED STATES PATENTS

| | | | |
|---|---|---|---|
| 3,067,495 | 12/1962 | Chase | 29—203 |
| 3,241,222 | 3/1966 | Timmermans | 29—203 |
| 3,248,789 | 5/1966 | Seaman | 29—428 |

THOMAS H. EAGER, *Primary Examiner.*

U.S. Cl. X.R.

29—25.16, 203, 211